US010061054B2

(12) United States Patent
Jacobson et al.

(10) Patent No.: US 10,061,054 B2
(45) Date of Patent: Aug. 28, 2018

(54) DOWNHOLE ANNULUS EVALUATION APPARATUS, SYSTEMS, AND METHODS

(71) Applicant: Halliburton Energy Services, Inc., Houston, TX (US)

(72) Inventors: Larry Alan Jacobson, Richmond, TX (US); Weijun Guo, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/576,109

(22) PCT Filed: Jul. 31, 2015

(86) PCT No.: PCT/US2015/043247
§ 371 (c)(1),
(2) Date: Nov. 21, 2017

(87) PCT Pub. No.: WO2017/023272
PCT Pub. Date: Feb. 9, 2017

(65) Prior Publication Data
US 2018/0136361 A1 May 17, 2018

(51) Int. Cl.
*G01V 5/10* (2006.01)
*E21B 47/00* (2012.01)
*E21B 43/04* (2006.01)

(52) U.S. Cl.
CPC .......... *G01V 5/102* (2013.01); *E21B 47/0005* (2013.01); *E21B 43/04* (2013.01)

(58) Field of Classification Search
CPC ...... E21B 43/04; E21B 47/0005; G01V 5/102
See application file for complete search history.

(56) References Cited

U.S. PATENT DOCUMENTS

| 4,631,405 A | 12/1986 | Smith, Jr. |
| 7,117,092 B2 * | 10/2006 | Jacobson ............... G01V 5/101 702/8 |
| 9,335,437 B2 * | 5/2016 | Beekman ............... G01V 5/104 |
| 9,869,791 B2 * | 1/2018 | Zhou ....................... G01V 5/04 |

(Continued)

FOREIGN PATENT DOCUMENTS

| WO | 2012064797 A2 | 5/2012 |
| WO | 2013158428 A1 | 10/2013 |

OTHER PUBLICATIONS

"International Application Serial No. PCT/US2015/043247, International Search Report dated Apr. 25, 2016", 3 pgs.

(Continued)

*Primary Examiner* — Marcus Taningco
(74) *Attorney, Agent, or Firm* — Gilliam IP PLLC

(57) ABSTRACT

Disclosed are apparatus, systems, and methods for determining the completeness of the cement sheath or gravel-pack annulus of a borehole based on gamma counts or count rates measured with a pulsed neuron tool deployed in the borehole in conjunction with a quantitative relationship between certain gamma count (rate) ratios and a parameter of completeness. In various embodiments, the determination utilizes the ratio of the net long inelastic count (rate) and the near capture count (rate), or the ratio of the net near inelastic count (rate) and the long capture count (rate). Additional apparatus, systems, and methods are disclosed.

22 Claims, 6 Drawing Sheets

(56) References Cited

U.S. PATENT DOCUMENTS

2013/0211724 A1\* 8/2013 Fitzgerald .............. G01V 5/101
 702/8
2013/0234012 A1 9/2013 Morris et al.
2013/0292109 A1 11/2013 Smith, Jr. et al.

OTHER PUBLICATIONS

"International Application Serial No. PCT/US2015/043247, Written Opinion dated Apr. 25, 2016", 7 pgs.

\* cited by examiner

DOWNHOLE ANNULUS EVALUATION APPARATUS, SYSTEMS, AND METHODS

BACKGROUND

A drilling operation for an oil or gas well usually involves drilling a borehole into a rock formation, lining the hole with steel pipe (also referred to as "casing"), and then pumping cement slurry into the annular space between the steel pipe and the borehole wall. Cementing the casing in place serves to reinforce the structural integrity and mechanical stability of the borehole, as well as to achieve "zonal isolation" by preventing fluid flow along the outside of the casing. When zonal isolation is lost, fluids from high-pressured formation regions can pass through the borehole to invade lower-pressured formation regions or exit the borehole in a mixture with other fluids, thereby potentially diluting the production fluid (e.g., oil or gas), damaging the hydrocarbon reservoir, contaminating aquifers, or otherwise causing environmental harm and/or reducing the profitability of the well. Accordingly, it is desirable that the cement completely fill the annular space between the casing and the formation.

A complete cement sheath is, however, not easy to accomplish. For example, irregularities in the borehole shape may render the requisite amount of cement unpredictable; voids, fractures, and pores in the surrounding formation may allow cement to escape the borehole; and fluids trapped in the annular space may be hard to replace with cement slurry. To detect such problems early on and thereby facilitate their correction or mitigation, the quality of the cement sheath is routinely assessed based on measurements taken with a suitable logging tool during a wireline logging operation.

A similar problem arises with respect to gravel packing. To prepare the well for production of hydrocarbons, production tubing is usually run through the well, inside the casing, into the hydrocarbon reservoir. The lower portion of the production tubing may have holes that admit oil and gas. The perforated section of the tubing may be surrounded by a screen and gravel pack designed to prevent sand infiltration into the production tubing. For proper functioning, the gravel pack desirably fills the annulus between the production tubing (or screen therearound) and borehole casing completely. In order to ensure the quality of a gravel pack and trigger remediating action if voids are detected therein, the gravel pack quality is likewise routinely measured, using similar tools and techniques as are employed for cement-quality assessment.

Logging tools for assessing cement and/or gravel-pack quality include, for example, sonic/ultrasonic, gamma-ray, neutron, and pulsed neutron tools. Measurements using pulsed neutron tools are conventionally based on the activation of silicon nuclei (i.e., the generation of unstable silicon isotopes) in the cement or gravel by high-energy neutrons, and spectral measurements of the gamma rays created during the decay of these isotopes. These measurements are generally performed in a logging pass separate from that used to evaluate the upward), adding time and cost to the logging operation. Certain alternative techniques, such as acoustic/ultrasonic measurements, suffer from low radial depth and may sometimes be sensitive only to the casing/cement contact. Accordingly, alternative methods for assessing cement or gravel-pack quality are needed.

DESCRIPTION

Disclosed herein are tools and techniques for assessing the quality of a cement sheath or gravel pack in a wellbore using specific ratios of gamma-count measurements taken with a pulsed neutron logging tool. That is, the inventors have determined that the ratio of a net long inelastic count (NLIC) metric to a near capture count (NCAP) metric and the ratio of a net near inelastic count (NNIC) metric to a long capture count (LCAP) metric are sensitive to the completeness of the cement annulus of a cased hole or the gravel-pack annulus around the perforated section of a production tube. (A "count metric," as understood herein, may be an instantaneous count rate (or quasi-instantaneous count rate, i.e., a count rate averaged over a short time period during which the instantaneous count rate does not change significantly), an average count rate, or an absolute count (i.e., the integral of a count rate over a certain period of time.) Advantageously, these ratios can be determined based on measurements taken during standard formation-evaluation logging operations using a pulsed-neutron logging tool. Thus, the approach described herein provides a new source of information about the completeness of a cement sheath or gravel pack without appreciably increasing the cost or complexity of well logging operations. In addition, the listed ratios are based on measured quantities that capture a radial depth sufficient to encompass the entire thickness of the gravel pack or cement sheath. Accordingly, cement and gravel-pack quality assessments in accordance herewith overcome some of the problems associated with the prior art.

Figure 1:
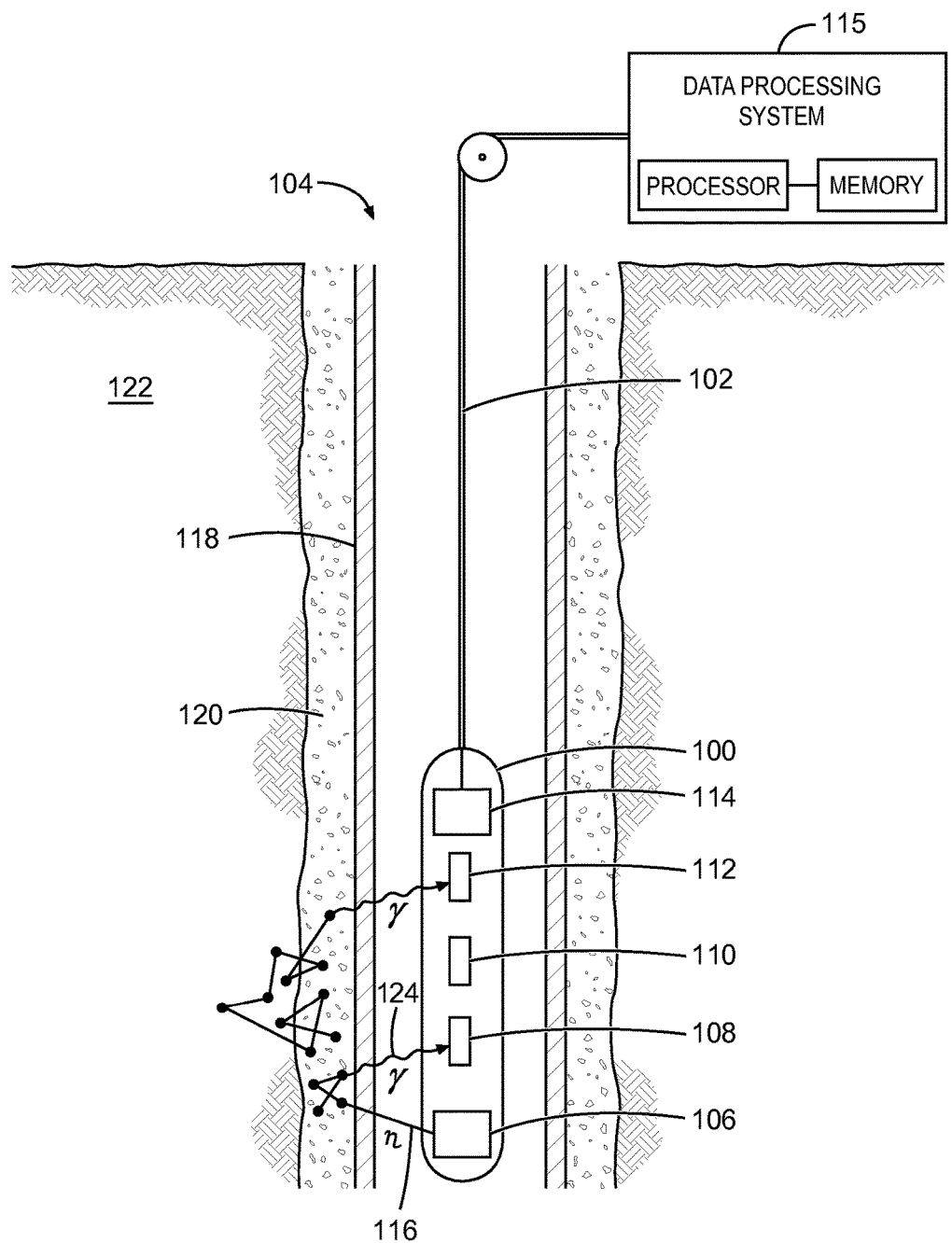
FIG. 1 is a diagram of a pulsed neutron tool deployed in a cased borehole, in accordance with various embodiments.

FIG. 1 illustrates a pulsed neutron tool 100 in accordance with various embodiments in one context in which it may be employed, namely, suspended from a wireline 102 inside a cased borehole 104. As will be readily appreciated by those of ordinary skill in the art, the tool 100 can, alternatively, be conveyed downhole using other types of conveyance, such as slickline, coiled tubing, downhole tractor, or drill pipe (e.g. used as part of a tool string within or near a bottom-hole-assembly during a logging/measurement-while-drilling operation). The pulsed neutron tool 100 may include a neutron source 106 and three gamma detectors 108, 110, 112 in a linear configuration, as well as associated control and processing circuitry 114. Such tools are readily available; an example product is the TMD3D™ (Thermal Multigate Decay-3 Detector) logging tool from Halliburton. The circuitry 114 may be in communication with a data processing system 115 (including, e.g., a processor and memory) located above surface, where measurements taken by the tool 100 may be logged and/or processed.

The neutron source 106, which is placed at the lower end of the tool 100, is configured to emit short pulses, or "bursts," of high-energy neutrons 116. For example, the neutron source 106 may include a compact linear accelerator that fuses isotopes of hydrogen (deuterium, tritium), producing neutrons with energies of about 14.1 MeV. Some neutron sources frequently employed in logging tools achieve neutron generation rates on the order of 108 neutrons per second, and bursts lasting for about 100 □s. The high-energy neutrons 116 generally penetrate the metal case of the tool 100 as well as the borehole casing 118, but are slowed down in the cement sheath 120 (or, in another use context, the gravel pack) or formation 122 by repeatedly scattering off nuclei (or magnetic fields from un-paired electrons) in these materials, creating gamma rays 124 (i.e., high-energy electromagnetic radiation, with photon energies usually exceeding 100 keV) in the process. Through repeated such inelastic collisions between the neutrons and nuclei, the neutrons 116 quickly "thermalize," i.e., reach a randomized distribution of energies with an average energy approaching the thermal energy of other particles in the material. The thermalized neutrons can be captured by the nuclei, again releasing gamma rays 124 in the process.

The gamma detectors 108, 110, 112 serve to detect and count gamma particles (i.e., photons) created during the neutron interactions with the cement or formation. The resulting gamma counts (or count rates) as a function of time capture information about the density and other properties of the materials. The farther away from the source a detector is placed, the greater is, statistically, the contribution to the gamma count of neutron scattering at greater radial depths within the materials. Accordingly, the gamma counts or count rates measured at the three detectors 108, 110, 112 generally differ in the relative contributions of gamma rays originating from the cement sheath and the formation, respectively. This enables the extraction of meaningful information about the cement sheath from the measurements. Further, since the gamma counts or count rates at each detector are generally proportional to the overall number of neutrons generated during a burst, ratios between the counts or count rates of two detectors can serve to normalize the measurement for neutron numbers, thereby neutralizing the effect of any burst-to-burst variations in neutron counts.

Figure 2:
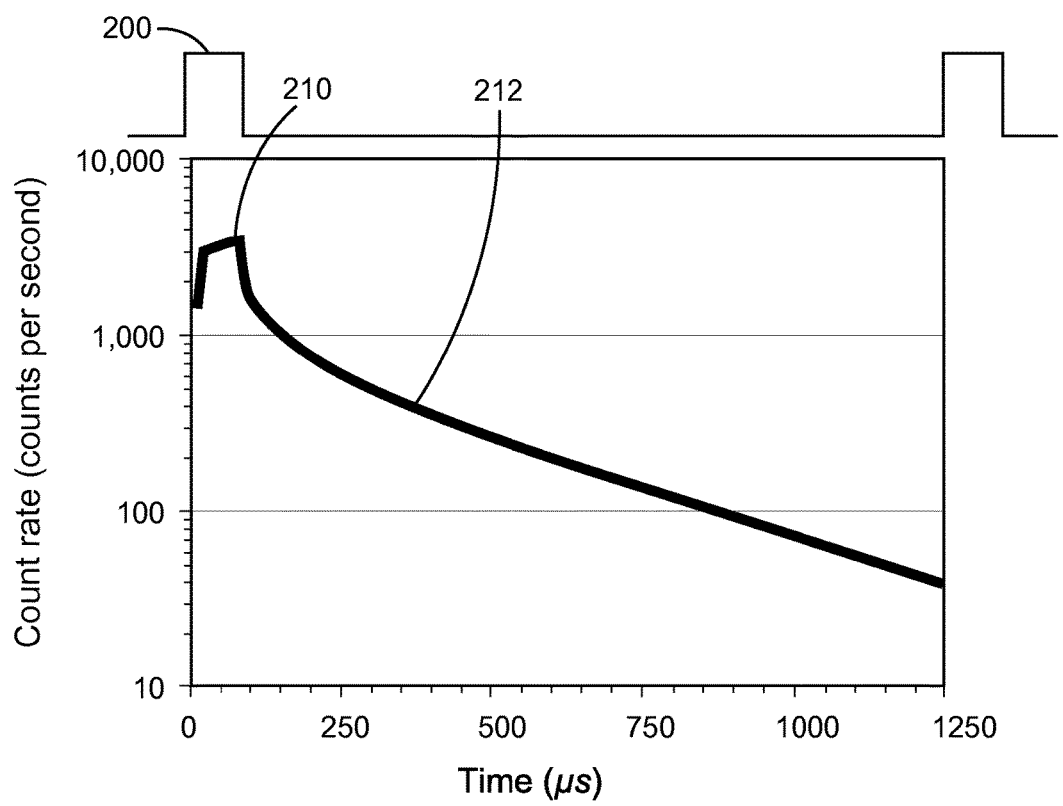
FIG. 2 is a graph of an example measured gamma count rate as a function of time for an individual neutron pulse, in accordance with various embodiments.

FIG. 2 shows an example measured gamma count rate (in counts per second) as a function of time for neutron pulses (indicated generally at 200) emitted at intervals of about 1.25 ms and each lasting for about 100 □s. An initial peak 210 of gamma rays, emitted during about the first 100 □s, i.e., substantially overlapping in time with the neutron burst, results largely from the inelastic collisions of neutrons with other particles; the gamma count rate of this peak is therefore generally referred to as the inelastic count rate. The remainder of the interval is dominated by gamma rays from neutron capture; accordingly, the gamma count rate for this portion is generally referred to as the capture count rate. The capture gamma rate decreases substantially exponentially in time (forming a "capture tail" 212 of the time-dependent gamma count rate curve). As the instantaneous inelastic and capture count rates vary as a function of time (especially the capture count rate), an average count rate may be associated with each of the inelastic and capture portions of the count-rate curve. For instance, to compute an average capture count rate, the instantaneous capture count rate (as depicted) may be integrated over the capture tail 212 and then divided by the time period associated with the capture tail (e.g., in the illustrated example, about 1150 □s. Similarly, the average inelastic count rate may be determined by integrating the instantaneous count rate under the peak 210 and then dividing it by the time period associated with the peak (e.g., in the illustrated example, about 90-100 □s).

Due to the exponential decay of the (instantaneous) capture count rate, there is usually a small capture gamma ray background resulting from neutrons generated during a first burst when the second neutron burst is emitted. To obtain more accurate inelastic count rates, this background (which can be quantified by extrapolation from the capture-count portion of the previous interval) may be subtracted from the total gamma count rate associated with the peak (i.e., the "gross inelastic count rate"), resulting in a so-called "capture-corrected" or "net" inelastic count rate. Further, gamma rays resulting from naturally occurring radioactive decays may form a gamma background sufficiently large, compared with the capture count rates, to warrant correction. Thus, in some embodiments, a "net" capture count rate is calculated by subtracting the natural radioactive background from the measured "gross" capture count rate. Hereinafter, no distinction between gross and net capture count rates is made; it is understood that "capture count rate" as used in the following description may refer to either the gross or the net capture count rate, depending on the level of accuracy and precision required in a particular application.

Instead of using the count rates (i.e., the number of gamma particles per unit time), the inelastic and capture counts themselves (i.e., the number of inelastic gamma particles and capture gamma particles) may in principle be used. For example, the count rate may be integrated over the peak to obtain the total inelastic count, and over the capture tail to obtain the total capture count. As long as the associated time periods remain consistent throughout measurements, these counts have the same information content as count rates. Of course, the numerical values of ratios (e.g., the NLIC to the NCAP) computed between total counts generally differ from those computed between count rates, due to the generally different integration times for inelastic and capture counts (which are divided out in the rates). Further metrics based on inelastic and capture counts or count rates, with different normalizations, may occur. Herein, these different metrics are generally referred to as "count metrics." The following discussion will reference, more specifically, average count rates, but modifications to use other count metrics (such as absolute counts) instead, and/or methods to convert between different count metrics, can be straightforwardly implemented by a person of ordinary skill in the art.

By measuring (net) inelastic count rates and capture count rates with two or more of the gamma detectors 108, 110, 112, various count-rate ratios can be formed, e.g., the ratio of the (net) inelastic count rate to the capture count rate measured by a single one of the detectors, or the ratio of the (net) inelastic count rates (or, alternatively, the capture count rates) of two different ones of the detectors. Count rates measured with a detector close to the neutron source (e.g., detector 108) are often labeled "near" count rates, and count rates measured with a detector far from the neutron source are often labeled "long" count rates. In accordance with various embodiments, ratios of different types of count rates (i.e., a net inelastic count rate and a capture count rate) measured with the detectors nearest to and farthest from the neutron source 106 (i.e., detectors 108, 112) are determined. Specifically, in certain embodiments, the ratio of the net long inelastic count rate (NLIC) (i.e., the net inelastic count rate measured with the third, farthest detector 112) to the near capture count rate (NCAP) (i.e., the capture count rate measured with the first, closest detector 108) is used, and in certain other embodiments, the ratio of the net near inelastic count rate (NNIC) (i.e., the net inelastic count measured with the first, closest detector 108) to the long capture count rate (LCAP) (i.e., the capture count rate measured with the third, farthest detector 112) is used. As illustrated below, these two ratios may differ significantly between cement or gravel on the one hand and water or hydrocarbons on the other hand, and therefore allow inferences of the cement or gravel-pack completeness.

In some embodiments, the ratios NLIC/NCAP and NNIC/LCAP are measured using the first and third detectors of a pulsed neutron tool with three gamma detectors, such as the TMD3DTM. Such tools are commonly employed for formation evaluation (e.g., to determine fluid saturations and porosity), hydrocarbon typing (e.g., differentiating between oil and gas), monitoring reservoir performance (e.g., water/oil/gas contact levels), locating of bypassed hydrocarbon zones or hydrocarbons trapped between production tubing and casing, etc. The three detectors of the TMD3DTM are spaced approximately one foot, two feet, and three feet, respectively, from the neutron source. While it can be economically and operationally advantageous to use the same tool (such as a standard tool with three detectors) for multiple different measurements (such as to determine fluid saturation in reservoirs and also cement or gravel-pack quality), the second, middle detector (corresponding to detector 110 in FIG. 1) is, of course, not necessary to determine the two above-mentioned ratios, and may therefore be omitted.

Accordingly, in some embodiments, NLIC/NCAP and NNIC/LCAP are determined from measurements taken with a pulsed neutron tool including only two gamma detectors. The first detector (which acquires the "near" count rates) may be placed at a center-to-center distance of up to fifteen inches from the detector, e.g., at a center-to-center distance within the range from eleven inches to thirteen inches. The second detector (which acquires the "long" count rates) may be placed at a distance from the neutron source of at least 27 inches, e.g., at a distance in the range from 27 inches to 36 inches. (At significantly larger distances, e.g., in excess of forty inches, the detector performance may be considerably reduced due to lower signal levels.)

Figure 3A:
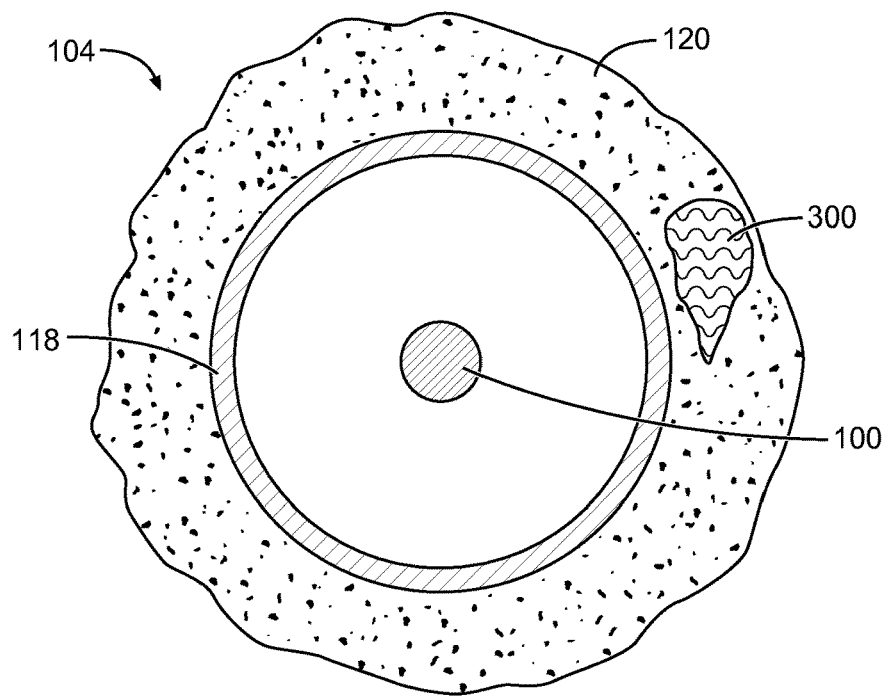
FIGS. 3A and 3B are borehole cross-sections illustrating a cement sheath and gravel pack, respectively, whose quality can be assessed in accordance with various embodiments.
Figure 3B:
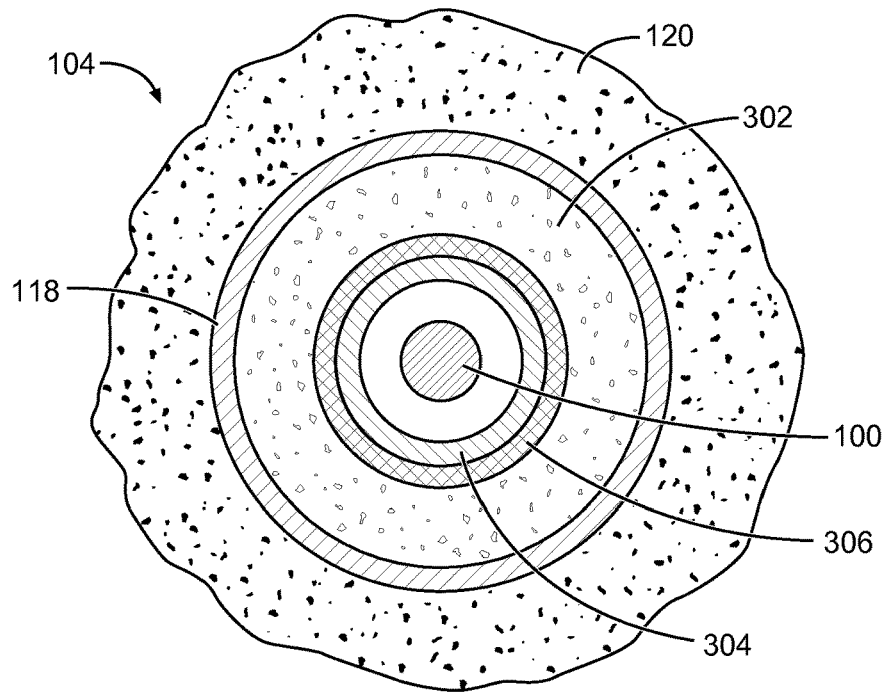

In accordance with various embodiments, determination of the ratio NLIC/NCAP and/or the ratio NNIC/LCAP serves to assess the completeness of a cement sheath or gravel pack in a borehole; these two application scenarios are illustrated in FIGS. 3A and 3B, respectively. FIG. 3A shows a cross-section through the cased, cemented borehole depicted in FIG. 1. As illustrated, the cement sheath 120 may be somewhat irregular in thickness (e.g., due to a borehole wall that deviates from a perfectly circular cross-section), and may enclose one or more pockets 300 of trapped fluids that prevent the annulus between the casing 118 and the borehole wall from being completely filled with cement. Other problems that reduce the filling fraction of the annulus below 100% may also occur; for example, cement may mix with fluid, and thus be contaminated (not shown).

FIG. 3B illustrates a configuration in which the pulsed neutron tool 100 is used to evaluate the gravel pack 302 filling the annulus between production tubing 304, or a screen 306 immediately adjacent to and surrounding the production tubing 304, and the casing 118. Like the cement sheath 120, the gravel pack may include voids or be diluted by trapped fluids, etc. Thus, the filling fraction of the gravel-pack annulus can be a useful measure of the quality of the gravel-pack.

Figure 4A:
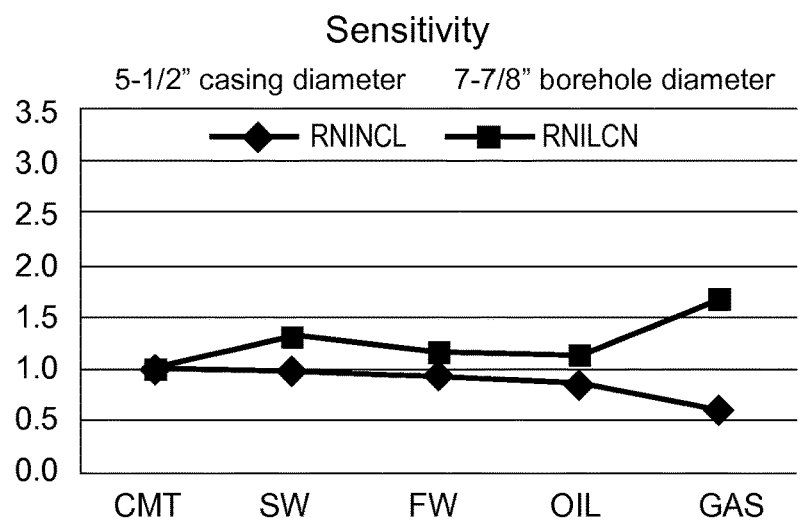
FIGS. 4A-4C are graphs of two gamma count rate ratios in accordance with various embodiments for a borehole annulus filled with cement and a variety of formation fluids, for three different respective annulus thicknesses.
Figure 4B:
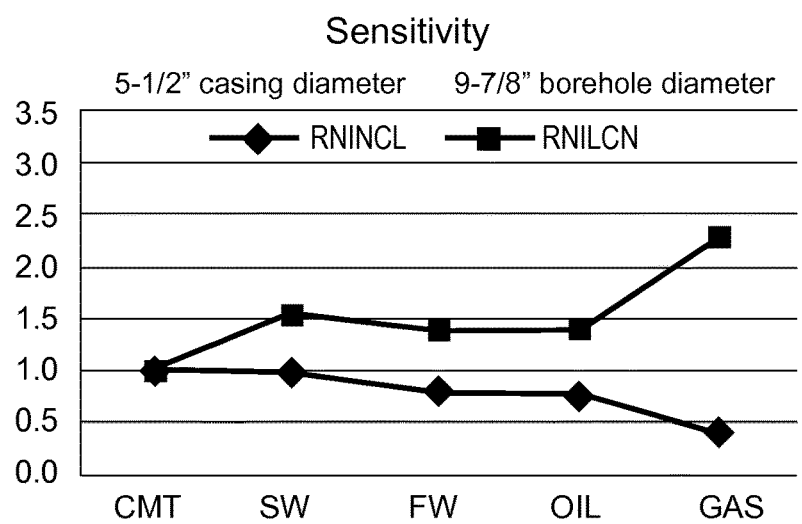
Figure 4C:
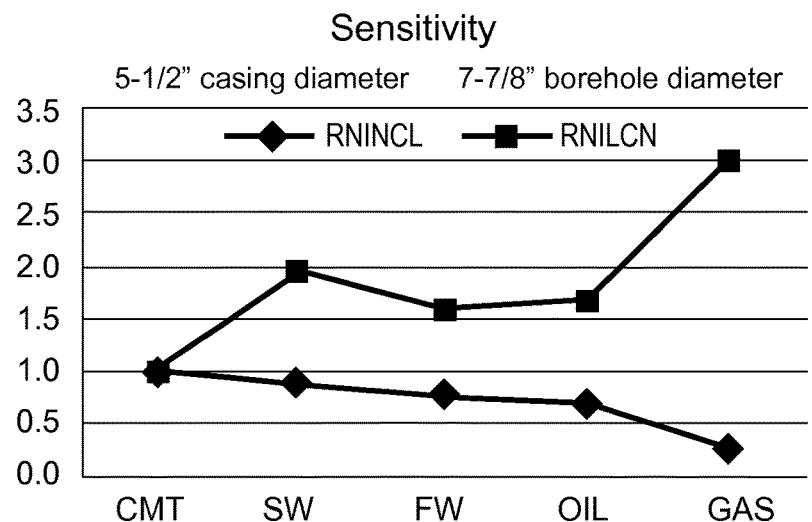

FIGS. 4A-4C and 5 show the results of computer simulations carried out to assess how the ratios RNILCN=NLIC/NCAP and RNINCL=NNIC/LCAP depend on the type of material present in a borehole annulus. For simulation purposes, in FIGS. 4A-4C, the casing diameter has been set to 5½ inches. The borehole diameter has been varied from 7⅞ inches for FIG. 4A over 9⅞ inches for FIG. 4B to twelve inches for FIG. 4C, corresponding to increasing thicknesses of the annulus (i.e., thicknesses of 1 3/16 inches, 2 3/16 inches, and 3¼ inches, respectively). Each of FIGS. 4A-4C shows the ratios RNILCN (squares) and RNINCL (diamonds) for an annulus completely filled with cement (CM), salt water (SW), fresh water (FW), oil, or gas. As can be seen, both ratios are suitable to discriminate between cement, salt water, fresh water or oil (the two of which are often hard to distinguish using this type of measurement), and gas; the sensitivity increases with increasing annulus thickness. As between RNILCN and RNINCL, the former exhibits greater sensitivity to the material, and due to its greater magnitude, it also has greater statistical significance.

Figure 5:
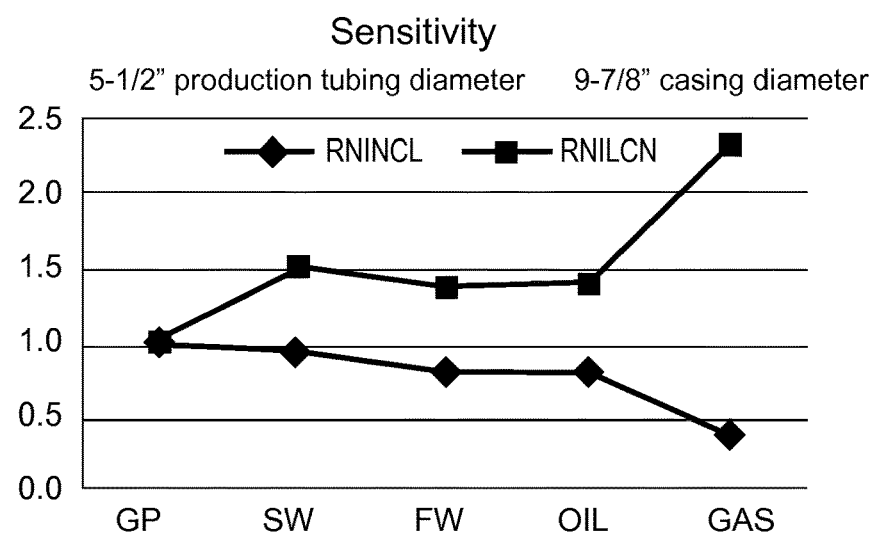
FIG. 5 is a graph of two gamma count rate ratios in accordance with various embodiments for a borehole annulus filled with gravel pack and a variety of formation fluids.

FIG. 5 shows the ratios RNILCN (squares) and RNINCL (diamonds) for an annulus completely filled with gravel pack (GP), salt water (SW), fresh water (FW), oil, or gas. In the underlying simulation, the diameter of the production tubing has been set to 5½ inches, and the casing diameter has been set to 9⅞ inches, corresponding to a gravel-pack annulus having a thickness of 2 3/16 inches. Again, both ratios are suitable to discriminate between gravel, salt water, fresh water or oil (which are often hard to distinguish using this type of measurement), and gas, and RNILCN exhibits greater sensitivity to the material and also has greater statistical significance.

From the data shown in FIGS. 4A-4C and FIG. 5, the ratios RNILCN and RNINCL as a function of the completeness of a cement or gravel-pack annulus can be readily determined by interpolation, assuming it is known which fluid or gas is trapped within the cement or gravel-pack annulus. For example, if the annulus between a 5½ inch casing and a 12 inch borehole is filled half with cement and half with salt water, an RNILCN of about 1.5 (i.e., the average of the RNILCNs measured separately for cement and salt water, as are shown in FIG. 4C) may be expected.

Accordingly, measurements of RNILCN and RNINCL can be used to assess the quality of a cement sheath or gravel pack in terms of a parameter indicative of completeness of the cement or gravel-pack annulus. One such parameter is the filling fraction, i.e., the percentage of the annulus volume, within a certain section of the borehole, that is filled with cement or gravel (rather than, e.g., a fluid).

Figure 6:
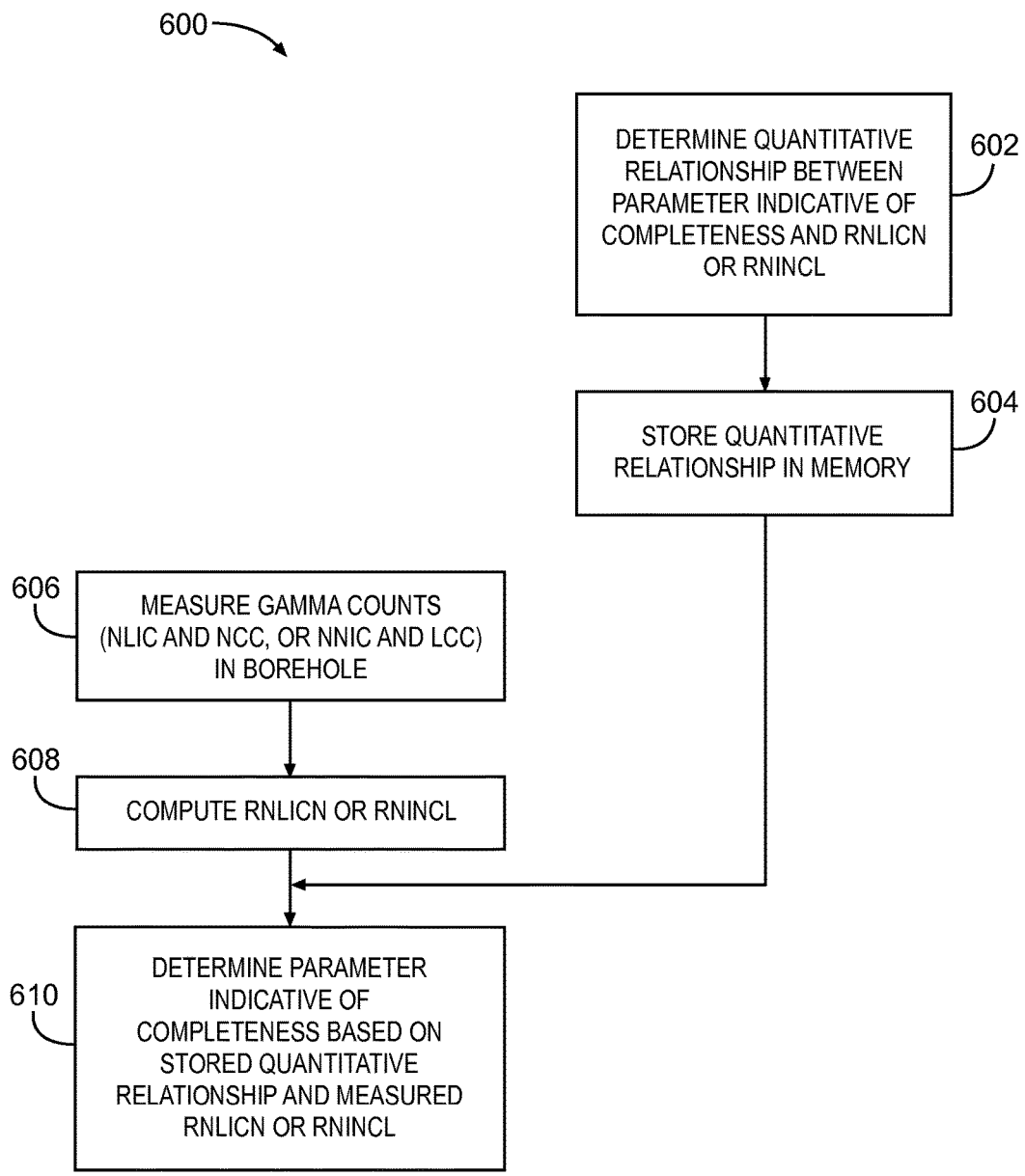
FIG. 6 is a flow chart of methods for determining, in accordance with various embodiments, the completeness of a cement or gravel-pack annulus of a borehole.

FIG. 6 illustrates a method 600 for determining the completeness of the borehole cement or gravel-pack annulus. The method involves determining a quantitative relationship between RNILCN or RNINCL and the parameter indicative of completeness (e.g., the filling fraction) of a cement or gravel pack annulus (for a given material or mixture of materials trapped in the incomplete cement or gravel pack annulus) (at operation 602). This quantitative relationship may be determined, e.g., by numerical simulation of neutron-induced gamma-ray generation (as are underlying the graphs of FIGS. 4A-4C and 5) or, alternatively, by laboratory measurements. In some embodiments, the RNILCN or RNINCL is first determined, by simulation or measurement, for different materials (e.g., cement, salt water, fresh water, gas, or oil) completely filling a borehole annulus. From the ratios determined for the individual materials, the RNILCN or RNINCL is then computed by averaging and/or interpolation for different filling fractions of the filling material of interest (e.g., cement), for a given trapped material (e.g., salt water or gas) or mixture of trapped materials. Alternatively, in some embodiments, the RNILCN or RNINCL is directly simulated or measured for different filling fractions of a given filling material and a given type of trapped material(s).

The relationship is stored in memory (operation 604) for subsequent evaluation of the annulus completeness based on measured gamma count ratios. (The term "memory," as used herein, encompasses all suitable machine-readable data storage media, whether volatile or non-volatile, including, e.g., magnetic storage media, optical storage media, random-access memory (RAM), read-only memory (ROM), etc.) For example, in some embodiments, the quantitative relationship is stored in the memory of a surface processing system 115 with which the pulsed neutron tool 100 communicates during a logging operation. In other embodiments, the quantitative relationship is stored in memory integrated directly into the pulsed neutron tool 100 (e.g., into control and processing circuitry 114).

The method 600 further involves, at operation 606, measuring net long inelastic and near capture counts (for RNILCN) or net near inelastic and long capture counts (for RNINCL) for a cement or gravel-pack annulus of a borehole, using a neutron logging tool with (at least) two suitably spaced detectors (as described in detail above) deployed in the borehole. One (or both) of the ratios RNLICN and RNINCL can then be computed from the measured gamma counts (operation 608), e.g., by the processing circuitry 114. Based on the determined ratio in conjunction with the stored quantitative relationship, the parameter indicative of completeness of the cement or gravel-pack annulus is determined (operation 610).

Many variations may be made in the tools, systems, and techniques described and illustrated herein without departing from the scope of the inventive subject matter. Accordingly, the scope of the inventive subject matter is to be determined by the scope of the following claims and all additional claims supported by the present disclosure, and all equivalents of such claims.

The invention claimed is:

1. A method, comprising:
    storing a quantitative relationship between a parameter indicative of completeness of at least one of a cement annulus or a gravel-pack annulus of a cased borehole and a ratio between a net long inelastic count metric and a near capture count metric measurable in the borehole;
    using a pulsed neutron tool deployed in the cased borehole, measuring the net long inelastic count metric and the near capture count metric, and determining a value of the ratio therebetween; and
    determining a value of the parameter of completeness for the borehole from the stored quantitative relationship and the determined value of the ratio.

2. The method of claim 1, wherein the neutron tool comprises a neutron source and three gamma detectors, a first one of the detectors being located at a first distance from the neutron source, a second one of the detectors being located at a second distance from the neutron source, and a third one of the detectors being located at a third distance from the neutron source, the second distance being greater than the first distance and the third distance being greater than the second distance, and wherein determining the ratio comprises measuring the net long inelastic count metric with the third detector and measuring the near capture count metric with the first detector.

3. The method of claim 1, wherein the neutron tool comprises a neutron source, a first detector located at a first distance from the neutron source, and a second detector located at a second distance from the neutron source, wherein the second distance is greater than about 27 inches, and wherein determining the ratio comprises measuring the net long inelastic count metric with the second detector and measuring the near capture count metric with the first detector.

4. The method of claim 3, wherein the first distance is no greater than about 15 inches.

5. The method of claim 3, wherein the first distance is between 11 inches and 13 inches.

6. The method of claim 3, wherein the second distance is between 27 inches and 36 inches.

7. The method of claim 1, further comprising determining the relationship between the ratio and the parameter indicative of completeness from at least one of laboratory measurements or numerical simulation of neutron-induced gamma-ray generation.

8. The method of claim 7, wherein determining the relationship between the ratio and the parameter indicative of completeness comprises determining the ratio separately for a plurality of materials completely filling the borehole annulus, and determining the ratio for the parameter of completeness for a selected combination of the materials based on the ratios determined separately for the materials of the selected combination.

9. The method of claim 1, wherein the parameter comprises a filling fraction of a borehole annulus.

10. A method, comprising:
    storing a quantitative relationship between a parameter indicative of completeness of at least one of a cement annulus or a gravel-pack annulus of a cased borehole and a ratio between a net near inelastic count metric and a long capture count metric measurable in the borehole;
    using a pulsed neutron tool deployed in the cased borehole, measuring the net near inelastic count metric and the long capture count metric, and determining a value of the ratio therebetween; and
    determining a value of the parameter of completeness for the borehole from the stored quantitative relationship and the determined value of the ratio.

11. The method of claim 10, wherein the neutron tool comprises a neutron source and three gamma detectors, a first one of the detectors being located at a first distance from the neutron source, a second one of the detectors being located at a second distance from the neutron source, and a third one of the detectors being located at a third distance from the neutron source, the second distance being greater than the first distance and the third distance being greater than the second distance, and wherein determining the ratio comprises measuring the net near inelastic count metric with the first detector and measuring the long capture count metric with the first detector.

12. The method of claim 10, wherein the neutron tool comprises a neutron source, a first detector located at a first distance from the neutron source, and a second detector located at a second distance from the neutron source, wherein the second distance is greater than about 27 inches, and wherein determining the ratio comprises measuring the net near inelastic count metric with the first detector and measuring the long capture count metric with the second detector.

13. The method of claim 12, wherein the first distance is no greater than about 15 inches.

14. The method of claim 12, wherein the first distance is between 11 inches and 13 inches.

15. The method of claim 12, wherein the second distance is between 27 inches and 36 inches.

16. The method of claim 10, further comprising determining the relationship between the ratio and the parameter indicative of completeness from laboratory measurements.

17. The method of claim 10, further comprising determining the relationship between the ratio and the parameter indicative of completeness by numerical simulation.

18. The method of claim 10, wherein the parameter comprises a filling fraction of a borehole annulus.

19. A system, comprising:
a pulsed neutron tool comprising a neutron source and first and second detectors, the second detector being at a greater distance from the source than the first detector;
memory having stored thereon a quantitative relationship between (i) a ratio of a net long inelastic count metric to a near capture count metric and (ii) a parameter indicative of completeness of at least one of a cement annulus or a gravel-pack annulus of a borehole; and
a processing module to determine the parameter indicative of completeness for at least one of a cement annulus or a gravel-pack annulus of a borehole, based at least in part on the stored relationship, a long inelastic count metric measured in the borehole with the second detector, and a near capture count metric measured in the borehole with the first detector.

20. The system of claim 19, wherein the first detector is at a distance of less than 15 inches from the source and the second detector is at a distance of at least 30 inches from the source.

21. A system, comprising:
a pulsed neutron tool comprising a neutron source and first and second detectors, the second detector being at a greater distance from the source than the first detector;
memory having stored thereon a quantitative relationship between (i) a ratio of a net near inelastic count metric to a long capture count metric and (ii) a parameter indicative of completeness of at least one of a cement annulus or a gravel-pack annulus of a borehole; and
a processing module to determine the parameter indicative of completeness for at least one of a cement annulus or a gravel-pack annulus of a borehole, based at least in part on the stored relationship, a near inelastic count metric measured in the borehole with the first detector, and a long capture count metric measured in the borehole with the second detector.

22. The system of claim 21, wherein the first detector is at a distance of less than 15 inches from the source and the second detector is at a distance of at least 30 inches from the source.

* * * * *